United States Patent Office 2,706,722
Patented Apr. 19, 1955

2,706,722

PREPARATION OF ANHYDROUS LINEAR POLYESTER COMPOSITIONS AND SHAPING THEREOF INTO USEFUL PRODUCTS

John R. Caldwell, Kingsport, Tenn., assignor to Eastman Kodak Company, Rochester, N. Y., a corporation of New Jersey No Drawing. Application March 6, 1952,
Serial No. 275,238

21 Claims. (Cl. 260—32.8)

This invention relates to the treatment of polymeric esters. It is particularly concerned with an improved method for processing high melting linear polyesters.

The linear polyesters employed in the process of the invention belong to the so-called high melting class. That is, they must be extruded, melted, or molded at temperatures above about 150° C. and in most cases they must be processed at temperatures in excess of 200° C. or above. At this temperature, if the moisture content of the polymer is greater than about 0.01 percent, the ester linkage is rapidly cleaved by hydrolysis and the molecular weight is degraded to give a product of no significant commercial or technical value. It is of utmost importance to maintain polyesters in an extremely dry state; numerous attempts have been made to develop intensive drying procedures. See Hardy, J. Soc. Chem. Ind., 67, 426 (1948); Hardy, Chem. and Ind., 1948, 59; Carpenter, J. Soc. Dyers Col., 65, 469. According to the processes of the prior art, it is necessary to use a combination of high vacuum, high temperature, and an efficient chemical drying agent. For example, a typical process involves heating a polymer to 150° C. in a vacuum over $P_2O_5$. It is obvious that such a procedure would be very difficult to apply on an industrial scale. Furthermore, the processes of the prior art do not provide for the maintenance of a dry, inert environment while a linear polyester is being handled, processed, etc. The prior art does not describe any process by which the dried polyester could be transferred from one container to another, loaded into molding presses or introduced into spinnerets, etc. without coming into contact with moisture and air.

I have now discovered a process for preparing a composition comprising a granulated substantially anhydrous linear polyester having a melting point above 150° C. (preferably about 180° to 200° C. or higher) which comprises admixing small particles of a linear polyester having a melting point above 150° C. with a liquid which has a boiling point in the range of about 100° C. to about 200° C., has a relatively low solubility for water and is inert toward the polyester particles at near its boiling point, and subjecting this admixture to distillation for a period of time sufficient to substantially eliminate all water from the admixture, this elimination being in the nature of a removal of an azeotrope of the liquid with water.

The process of this invention provides four important practical advantages over the drying processes of the prior art:

*a.* The process is carried out at atmospheric pressure in ordinary distillation equipment. Vacuum pumps and vacuum vessels are not required.

*b.* The dried polyester can be stored for any length of time in ordinary closed containers.

*c.* The dried polyester can be transferred, loaded into molding presses, etc. without special equipment.

*d.* An inert, dry atmosphere can be maintained at all times, up to the final stages of extrusion, molding, etc.

The process of the invention is especially valuable for the compression moldings, injection molding, and melt spinning of high melting linear polyesters on a commercial scale.

The process described above results in the preparation of a composition comprising a granulated linear polyester of a polycarboxylic acid and a polyhydric alcohol having a melting point above 150° C. (in many cases in excess of about 180° to 200° C.) and containing less than about 0.01% water which can be extruded, molded or spun without substantial degradation by oxidation or hydrolysis which process comprises admixing particles in the size range of from about 0.01 to about 0.25 inch (preferably from about 0.05 to about 0.20 inch) of a linear polyester of a polycarboxylic acid and a polyhydric alcohol having a melting point above 150° C. with a liquid whose properties have been described in detail above and which is selected from the group consisting of dialkyl ethers containing from 6 to 16 carbon atoms, arylalkyl ethers containing from 7 to 16 carbon atoms, diaryl ethers containing from 12 to 18 carbon atoms, aryl hydrocarbons of the benzene series containing from 6 to 16 carbon atoms, dialkyl ketones containing from 4 to 12 carbon atoms, and alkyl alkanoates containing from 4 to 12 carbon atoms, and subjecting this admixture to distillation for a period of time sufficient to substantially eliminate all water from the admixture.

The products which can be obtained according to such processes as have been described above are substantially anhydrous compositions useful in forming plastic materials which comprise a mixture of a granular linear polyester of a polycarboxylic acid and a polyhydric alcohol having a melting point above 150° C. and containing less than 0.01% water, admixed with a sufficient quantity of a liquid to substantially avoid contact of the granular polyester with atmospheric moisture, this liquid having the properties described above, viz., a boiling point in the range of about 100° C. to about 200° C., a relatively low solubility for water, and inert toward the polyester particles in the vicinity of the boiling point of the liquid.

These products can be employed in compression molding, injection molding, melt spinning, extrusion, etc. This can be accomplished by a method of shaping a substantially anhydrous linear polyester under substantially anhydrous conditions which comprises heating small particles of an anhydrous linear polyester coated with an inert liquid protecting the surface of the particles from water whereby this heating substantially completely evaporates the liquid thereby enveloping exposed particles of the polyester with a substantially anhydrous vapor, continuing the heating thereby changing the particles of the polyester to a plastic mass and shaping this plastic mass under substantially anhydrous conditions.

An object of this invention is to provide a new and improved method for drying high molecular weight linear polyesters. Another object of this invention is to provide a granulated linear polyester product which inherently excludes air and moisture during the storage and handling thereof. A further object of this invention is to provide a method for shaping polyesters which includes a convenient method for maintaining an inert atmosphere during the shaping (e. g., the extrusion, molding, spinning, etc.). Other objects are apparent elsewhere herein.

The objects of this invention can be accomplished as already described hereinabove. Thus, the process involves heating a granulated polyester with a high boiling liquid to remove adsorbed water through the combined action of azeotropic distillation and displacement adsorption. The resulting polyester can be stored and handled in the liquid or under the vapors of the liquid in order to maintain a dry, inert atmosphere. This atmosphere can be employed until the final stages of extrusion or melting are carried out. Degradation of the polymer by oxidation or hydrolysis is substantially eliminated. It is advantageous to employ a supplemental atmosphere of an inert gas (e. g. nitrogen) during the final stages of extrusion, melting, etc. in order to supplement the inert vapors of the protective liquid under circumstances whereby such vapors are rapidly disseminated.

The polyesters advantageously used in the process of this invention have softening temperatures above 150° C. and advantageously in the range of 180–240° C. They are made by processes well known in the prior art. For example, the linear polyester made from terephthalic acid and ethylene glycol (softening point about 230° C.) can be advantageously employed. Other types of high melting linear polyesters are described in British Patent Numbers 578,079, 604,073, 604,074, 604,075, U. S. Patent 2,465,150 and in my copending application, Serial No. 143,594 filed on February 10, 1950, now U. S. Patent 2,614,120 dated October 14, 1952. Other polyesters described in the prior art can also be advantageously employed.

The polyesters described in my copending application referred to above can be prepared by a process which comprises reacting a dicarboxydiphenyl sulfone having the following formula:

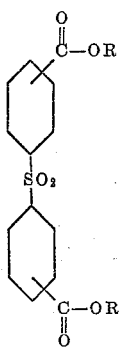

wherein each nuclear substituent group is located in a position selected from among the meta and para positions, and each R represents a member selected from the group consisting of a hydrogen atom, an alkyl radical containing from 1 to 4 carbon atoms and a β-hydroxyalkyl radical containing from 2 to 4 carbon atoms, with an alkylene glycol having the formula:

$$R_1\text{—O—}(CH_2)_n\text{—O—}R_1$$

wherein $n$ represents a positive integer from 2 to 6 and $R_1$ represents a member selected from the group consisting of a hydrogen atom and an acyl radical containing from 2 to 4 carbon atoms, in the presence of a compound selected from the group consisting of the alkali metals, the alkaline earth metals, and their hydroxides and alkoxides, in an inert atmosphere at a temperature which is increased gradually up to about 240° to 280° C. and while the temperature is within its maximum range, forming a vacuum under which the polyesterification is completed.

It is obvious that other glycols (polyhydric alcohols) and other polycarboxylic acids can be similarly employed to prepare polyesters as described in the above referred-to prior art. Such condensations produce polyesters which can be treated in accordance with this invention. The condensations producing polyesters useful in accordance with the teachings of the present invention can be effected generally by heating the components at temperatures of 150°–350° C., but below decomposition temperatures, and preferably at 200 to 280° C. or 300° C. If desired, catalysts can be present, for example catalysts facilitating the elimination of water, such as p-toluene sulphonic acid or a trace of phosphoric acid, catalysts such as potassium carbonate or tertiary organic bases which absorb hydrochloric or ester interchange catalysts such as alkali metals or alkali metal alcoholates. When a volatile by-product is produced such as water, an alcohol or a phenol, it is of advantage to conduct the reaction, at least in its later stages, in vacuo and especially under an extremely low absolute pressure. The condensations are preferably carried out in an atmosphere of an oxygen-free inert gas, for example hydrogen or nitrogen, a stream of which may be passed over or through the reaction mixture. When an acid chloride is employed as one of the reagents, it is advisable to use an inorganic alkali or a tertiary organic base, such as pyridine or dimethylaniline, or a terpene so as to combine with the hydrogen chloride set free. Such condensations are best effected with the reagents and their products of reaction in the molten state or in solution in a suitable solvent medium, for example m-cresol or phenol, which is liquid at the reaction temperature. By such processes the resulting products are polymers which are of sufficiently high molecular weight to be capable of forming self-supporting films or filaments and preferably of sufficiently high molecular weight to give filaments which can be cold drawn. Accordingly, except in the case of using a reagent which can be volatilized under the reaction conditions, e. g. a volatile glycol, the reagents should be used in such proportions that the complementary hydroxy and carboxy groups are present in the reaction mixture in substantially equivalent amounts and the reaction is continued until the desired high molecular weight is achieved. In some cases this may take many hours or even some days. By substantially equivalent amounts is meant amounts which are chemically equivalent within five per cent. The nearer the ratio is to chemical equivalence, the higher the molecular weight which can be achieved; accordingly, it is preferred to use amounts that are close to chemical equivalence (within a small per cent, e. g. less than two per cent). In poly-esterifications involving volatile glycols, the glycol can be used in excess and allowed to evaporate away from the sphere of reaction as the condensation proceeds.

The high boiling point liquid used in the process of the invention should have the following properties:

a. Boiling point in the range of 100° C. to 200° C. and preferably 110° C. to 160° C.

b. Inert toward the polyester under the conditions of use.

c. Low solubility for water.

d. Capable of removing adsorbed water from the polyester at reflux temperature.

The following classes of compounds can be advantageously employed as the high boiling liquids for use in this invention: (a) ethers such as di-butyl ether, di-amyl ether, methyl hexyl ether, ethyl octyl ether, methyl phenyl ether, etc., (b) aromatic hydrocarbons such as toluene, xylene, cumene, ethyl benzene, di-ethyl benzene, butyl benzene, and di-isopropyl benzene, (c) ketones such as methyl amyl ketone, ethyl hexyl ketone, and di-isobutyl ketone, (d) esters such as butyl acetate, amyl acetate, butyl butyrate, and hexyl propionate. The preferred liquids which can be especially advantageously employed in the process of this invention are toluene, xylene, cumene, di-butyl ether, di-isobutyl ketone, and hexyl acetate.

The polyester is advantageously used in a form which is granulated or powdered by the usual methods to give a particle size which advantageously lies in the range of approximately 0.05 inch to 0.20 inch. As indicated above, larger and smaller particles can also be employed. The granulated resin is then advantageously placed in a vessel equipped with a distilling column and continuous decanter which separates water from the distillate and returns the anhydrous solvent to the vessel. Other equivalent apparatus can also be employed. The liquid is advantageously added to the vessel in sufficient quantity to cover the granules. Heat is then applied and the liquid is advantageously allowed to reflux until no more water is collected in the trap. The dehydrated granules can be stored under the liquid and thus can be advantageously kept from contact with air and moisture. The granules, while still wet with the liquid, can advantageously be transferred to molding presses, melt spinning devices, and the like. The liquid coating can then be advantageously evaporated by heating prior to molding, extrusion, spinning, etc.

Example 1

A linear polyester of molecular weight of about 20,000 to about 30,000 was prepared from terephthalic acid and ethylene glycol by known methods (see above). This polyester melted at about 230° C. The polyester was then granulated to ⅛ inch particles.

One hundred grams of the granulated polyester and 200 cc. toluene were placed in a distilling flask equipped with continuous decanter. The toluene was boiled, and the toluene-water azeotrope was separated in the decanter, allowing the toluene to return to the flask. After 40–60 minutes of refluxing, the water was completely removed from the polyester.

The resulting dehydrated polyester granules can be stored for any desired time under the toluene. The toluene prevents moisture and air from coming into contact with the polyester.

Example 2

Fibers were produced by the melt spinning process employing the product of Example 1. The toluene was decanted, and the granules, while still wet with toluene, were placed in the melting chamber of a fiber spinning machine. The melting chamber was closed, except for a small vent hole, and heat was applied until a temperature of 110° to 120° C. was reached. Under these conditions, the toluene was evaporated and thereby displaced the air and moisture in the melting chamber. After the toluene had evaporated, pure, dry nitrogen was pressed into the chamber and extrusion of the filaments was carried out in the usual way at a temperature of 230–240° C. The fibers prepared by this process showed substantially no degradation by hydrolysis.

*Example 3*

A linear polyester was prepared from 1 mol of 4,4'-dicarboxy diphenyl sulfone, 0.6 mol diethylene glycol, and 0.4 mol ethylene glycol as described in my copending application referred to above. This polymer softens at about 220° C. The polyester was then granulated to about 0.1 inch particle size. The granules were refluxed with xylene, using a decanter to remove entrained water, as described in Example 1. All of the adsorbed water on the surface of the granules was removed by this treatment.

The xylene was decanted from the dehydrated granules of the polyester and while the resin was still wet with xylene, it was placed in the cavity of a compression molding machine. The cavity was closed except for a small space to allow the escape of xylene vapors. The mold was then heated at 120–130° C. to evaporate the xylene and displace the air and moisture in the cavity. The mold was then heated to 220° C. and pressure was applied in the usual way. Shaped articles were obtained which were hard and tough and showed no evidence of degradation by hydrolysis.

*Example 4*

A linear polyester was prepared from 1 mol of 4,4'-dicarboxy diphenyl sulfone, 0.7 mol ethylene glycol, and 0.3 mol decamethylene glycol. This polymer softens at about 230° C. The resin was granulated to about 0.1 inch particle size and the granules were refluxed with dibutyl ether, using a decanter to separate the water. The ether was decanted from the granules and they were placed in the preheating cylinder of an injection molding press. The cylinder was heated to 220–230° C. to vaporize the ether and displace air and moisture from the cylinder. The molding process was then carried out in the usual way. Hard, tough products, showing no degradation by hydrolysis, were obtained.

Other polyesters can be similarly treated with other high boiling liquids to obtain similar results to those discussed in the above examples. The polyesters obtained have similar properties and can be similarly employed.

I claim:

1. A process for preparing a composition comprising a granulated linear polyester of a polycarboxylic acid and a polyhydric alcohol having a melting point above 150° C. containing less than 0.01% of water which comprises admixing small particles of a linear polyester having a melting point above 150° C. with a liquid having a boiling point in the range of about 100° C. to about 200° C. which has a relatively low solubility for water and is inert toward the polyester particles at near its boiling point, and subjecting this admixture to a distillation operation for a period of time sufficient to substantially eliminate all water from the admixture.

2. A process for preparing a composition comprising a granulated linear polyester of a polycarboxylic acid and a polyhydric alcohol having a melting point above 150° C. and containing less than about 0.01% water which can be extruded, molded or spun without substantial degradation by oxidation or hydrolysis which comprises admixing particles in the size range of from about 0.05 to about 0.20 inch of a linear polyester of a polycarboxylic acid and a polyhydric alcohol having melting point above 150° C. with an inert liquid which has a boiling point in the range of about 100° C. to about 200° C., has a relatively low solubility for water, is inert toward the polyester particles at near its boiling point and is selected from the group consisting of dialkyl ethers containing from 6 to 16 carbon atoms, arylalkyl ethers containing from 7 to 16 carbon atoms, diaryl ethers containing from 12 to 18 carbon atoms, aryl hydrocarbons of the benzene series containing from 6 to 16 carbon atoms, dialkyl ketones containing from 4 to 12 carbon atoms, and alkyl alkanoates containing from 4 to 12 carbon atoms, and subjecting this admixture to distillation for a period of time sufficient to substantially eliminate all water from the admixture.

3. A process as defined in claim 2 wherein the inert liquid is toluene.

4. A process as defined in claim 2 wherein the inert liquid is xylene.

5. A process as defined in claim 2 wherein the inert liquid is dibutyl ether.

6. A process as defined in claim 2 wherein the inert liquid is cumene.

7. A process as defined in claim 2 wherein the inert liquid is diisobutyl ketone.

8. A substantially anhydrous composition useful in forming plastic materials which consists of a mixture of a granular linear polyester of a polycarboxylic acid and a polyhydric alcohol having a melting point above 150° C. and containing less than 0.01% water, admixed with a sufficient quantity of an inert liquid to substantially avoid contact of the granular polyester with atmospheric moisture, this liquid having a boiling point in the range of about 100° C. to about 200° C., having a relatively low solubility for both water and the polyester, being inert toward the polyester particles in the vicinity of the boiling point of the liquid and being selected from the group consisting of dialkyl ethers containing from 6 to 16 carbon atoms, arylalkyl ethers containing from 7 to 16 carbon atoms, diaryl ethers containing from 12 to 18 carbon atoms, aryl hydrocarbons of the benzene series containing from 6 to 16 carbon atoms, dialkyl ketones containing from 4 to 12 carbon atoms, and alkyl alkanoates containing from 4 to 12 carbon atoms.

9. A composition as defined in claim 8 wherein the inert liquid is toluene.

10. A composition as defined in claim 8 wherein the inert liquid is xylene.

11. A composition as defined in claim 8 wherein the inert liquid is dibutyl ether.

12. A composition as defined in claim 8 wherein the inert liquid is cumene.

13. A composition as defined in claim 8 wherein the inert liquid is diisobutyl ketone.

14. A method of shaping under substantially anhydrous conditions a polyester of a polycarboxylic acid and a polyhydric alcohol containing less than 0.01% water which comprises heating small particles of an anhydrous linear polyester coated with an inert liquid protecting the surface of the particles from water whereby this heating substantially completely evaporates the liquid thereby enveloping exposed particles of the polyester with a substantially anhydrous vapor, continuing the heating thereby changing the particles of the polyester to a plastic mass and shaping this plastic mass under substantially anhydrous conditions, the inert liquid having a boiling point in the range of about 100° C. to about 200° C., having a relatively low solubility for water and being inert for the polyester particles in the vicinity of the boiling point of the liquid.

15. A method of forming into a desired shape granules of a substantially anhydrous linear polyester of a polycarboxylic acid and a polyhydric alcohol having a moisture impervious and vaporizable inert liquid coating thereon, said polyester having a melting point above 150° C. and containing less than 0.01% water, which comprises heating the coated granules to vaporize said inert liquid coating and to displace moisture in the vicinity of the granules with a gaseous atmosphere generated from said vaporizable coating, and then further heating the granules under substantially anhydrous conditions to plasticity and forming the resulting plastic mass by pressure into a desired shape, the inert liquid having a boiling point in the range of about 100° C. to about 200° C., having a relatively low solubility for water and being inert toward the polyester particles in the vicinity of the boiling point of the liquid.

16. A process as defined in claim 15 wherein the inert liquid is selected from the group consisting of dialkyl ethers containing from 6 to 16 carbon atoms, arylalkyl ethers containing from 7 to 16 carbon atoms, diaryl ethers containing from 12 to 18 carbon atoms, aryl hydrocarbons of the benzene series containing from 6 to 16 carbon atoms, dialkyl ketones containing from 4 to 12 carbon atoms, and alkyl alkanoates containing from 4 to 12 carbon atoms.

17. A process as defined in claim 16 wherein the inert liquid is toluene.

18. A process as defined in claim 16 wherein the inert liquid is xylene.

19. A process as defined in claim 16 wherein the inert liquid is dibutyl ether.
20. A process as defined in claim 16 wherein the inert liquid is cumene.
21. A process as defined in claim 16 wherein the inert liquid is diisobutyl ketone.

References Cited in the file of this patent

UNITED STATES PATENTS

| | | |
|---|---|---|
| 2,460,582 | Japs | Feb. 1, 1949 |
| 2,597,643 | Izard et al. | May 20, 1952 |